United States Patent
Tatarchenko

(10) Patent No.: US 9,146,552 B2
(45) Date of Patent: Sep. 29, 2015

(54) MODULAR ENGINEERING SYSTEM

(76) Inventor: Nikolai Valentinovich Tatarchenko, Moscow (RU)

(*) Notice: Subject to any disclaimer, the term of this patent is extended or adjusted under 35 U.S.C. 154(b) by 1273 days.

(21) Appl. No.: 12/448,209

(22) PCT Filed: Dec. 13, 2007

(86) PCT No.: PCT/RU2007/000704
§ 371 (c)(1),
(2), (4) Date: Jun. 12, 2009

(87) PCT Pub. No.: WO2008/073005
PCT Pub. Date: Jun. 19, 2008

(65) Prior Publication Data
US 2009/0312845 A1    Dec. 17, 2009

(30) Foreign Application Priority Data
Dec. 13, 2006  (RU) ................. 2006143865

(51) Int. Cl.
*G06F 15/16* (2006.01)
*G05B 19/042* (2006.01)
*G06F 3/06* (2006.01)

(52) U.S. Cl.
CPC .............. *G05B 19/042* (2013.01); *G06F 3/067* (2013.01)

(58) Field of Classification Search
CPC ..................................................... G06F 3/067
USPC ....................................................... 709/224
See application file for complete search history.

(56) References Cited

U.S. PATENT DOCUMENTS

| | | | | |
|---|---|---|---|---|
| 5,684,374 | A * | 11/1997 | Chaffee | 318/616 |
| 8,578,391 | B2 * | 11/2013 | Kentaroh et al. | 719/310 |
| 2004/0128013 | A1 * | 7/2004 | Blawat et al. | 700/100 |
| 2005/0239545 | A1 * | 10/2005 | Rowe | 463/29 |
| 2005/0268070 | A1 * | 12/2005 | Baxter | 711/203 |
| 2006/0025891 | A1 * | 2/2006 | Budike | 700/275 |
| 2006/0028212 | A1 * | 2/2006 | Steiner et al. | 324/527 |
| 2006/0243815 | A1 * | 11/2006 | Lee et al. | 236/49.3 |
| 2006/0293797 | A1 * | 12/2006 | Weiler | 700/284 |
| 2007/0162536 | A1 * | 7/2007 | Ostrovsky et al. | 709/200 |

* cited by examiner

*Primary Examiner* — Hamza Algibhah
(74) *Attorney, Agent, or Firm* — Nath, Goldberg & Meyer; Jerald L. Meyer; Stanley N. Protigal

(57) ABSTRACT

The modular engineering system contains interacting controllers (1-3), each connected with peripheral equipment located in a zone. The controllers are universal and operate using the standard software, and their interfacing with peripheral equipment (10-15) is provided by the address micromodules (4-9) with microprocessors 33; microprocessors have plug-and-play configuration for dynamic individual event and data processing, their transformation to the unified program code and transmission to the controller (1-3) and for transformation of the unified code of controller (1-3) to the individual commands for peripheral equipment (10-15); the single address space is organized, this provides interfacing of data exchange between peripheral equipment and controllers; and it is possible to register and receive the information about certain events.

9 Claims, 4 Drawing Sheets

MODULAR ENGINEERING SYSTEM

This is a National Phase Application filed under 35 U.S.C. 371 as a national stage of PCT/RU2007/000704, filed on Dec. 13, 2007, and claims benefit to Russian Patent Application No. 2006143865, filed on Dec. 13, 2006, the entire content of which is hereby incorporated by reference in its entirety.

FIELD OF THE INVENTION

This engineering solution is related to directing and controlling universal systems, in particular to different technological process controlling tools—for collecting, processing and registration of diagnostic and command notifications of different types, as well as for controlling of acoustic, optical and other ennunciators and various executive devices of address type that have modular distributed structure integrated by digital interface (address bus). The system can be applied in combined building maintenance systems, which include the means of intrusion and fire protection, fire extinguishing means, access controlling and regulating means (turnstiles, gateways, bolts, bars, doors), directing and controlling means of engineering equipment (air-conditioning and ventilation, water and power supply with control of water and/or power consumption), lighting control and so on.

PRIOR ART

There is the modular engineering system for power plant, which consists of a great number of interacting parts and common control system of automatic devices for different purposes, these automatic devices are linked one to other devices and to controlling unit via data bus, which is used for important for the plant data transmission and characterized by the following: automatic devices in accordance with the technological structure integrated in independently operated units, and each unit is corresponded to functional chain (1-n) that contains a great number of partial functions, these partial functions are linked via common data line, which transmit the important only for unit operation data, each partial function include a lot of subsystems with controllable plant components (application RU No 94021650, published in 2003).

The disadvantages of this system are complicated adjustment, functional abilities narrowness that limits the variety of peripheral equipment, and unreliability of installation state and executive devices control.

There is the modular engineering system of technological processes control and directing, that includes personal computer (PC) and group of controllers integrated by digital interface, linked via local network, each controller is connected to peripheral equipment in separate part of the complex, equipped with transducers, and also executive devices, ennunciators, integrated in network personal workstations and servers on the base of personal computers (PC), each controller includes central processing unit (CPU) for functional modules and executive devices control, and functional units (FU) with configurable structure, all these are used for transducers' signals processing and generating commands to executive devices, connected via data VME-bus; functional units FU with configurable structure include the VME-bus interface card, mezzanines of input and output, linked via first group of terminals to signal processing and directing card, and via second group of terminals to inputs and outputs of functional unit for connection of external transducers and executive devices (RU No 2279117, 27.02.2006, prototype).

The disadvantages of this system are complicated adjustment, functional abilities narrowness because it has fixed range of settings that require reboot once configuration has been changed, and unreliability of executive devices control as the system resources are not divided at different levels and this leads to clashes.

The technical goal of invention is creation of effective modular engineering system, as well as the development of existent modular engineering systems.

The engineering solution shall provide more simple adjustment, extension of functional abilities for optimal system assembling and interaction with transducers of different construction, software and measured points, installed on long-distance communication lines, and for control of executive gears of different types, warning elements due to possibility of hardware configuration adjustment without operator's interference and without need to reboot; the power supply reliability can be improved due to possibility of dynamic switch of system devices to the power-saving mode that allows for devices to use the energy for useful work only, and the devises which is not used during the preset time interval shall be switched off and switched on later by request; the reliability and accuracy of executive devices control shall be improved as well, as this eliminates the risk of compatibility failure in case of static and impulsive interferences.

SUMMARY OF THE INVENTION

The essence of this engineering solution is that the modular engineering system contains interacting controllers, each of them is connected with the group of peripheral equipment located in one of the complex's zones, which includes transducers, executive devices and announcers; controllers are universal and operate using the standard software, and their interfacing with peripheral equipment is provided by the address micro-modules with microprocessors; microprocessors have plug-and-play configuration for dynamic individual event and data processing, their transformation to the unified program code and transmission to the controller and for transformation of the unified code of controller to the individual commands for peripheral equipment; the single address space is organized, this provides interfacing of data exchange between peripheral equipment and controllers; and it is possible to register and receive the information about certain events; at the same time peripheral equipment joint to the groups, each of these groups is connected with the controller using one of interfacing address micro-modules.

The essence of the invention is in that the personal computers are used as the universal controllers, and for purpose of data registration and notices of certain events transmission all PC are connected to the central PC.

Thus the above-mentioned the controller has printed circuit card, which contains microprocessor, and power supply source, permanent memory device, internal clock device and executive relay control scheme, connection lines with communication channel interface and protection scheme, alarm interface scheme, base amplifier, connected to the microprocessor; internal clock device is a device of real time and date control together with permanent memory is connected to microprocessor; the power supply is provided by ac-to-dc inverter, diode, external accumulator charging control scheme, and three voltage transducers; the first and second transducers are linked to the output of ac-to-dc inverter, and the third transducer is linked to the microprocessor, permanent memory, internal clock device and communication channel interface and protection scheme; microprocessor is connected to the control chain of external accumulator charging control scheme, which has a link on input to the first voltage transducer, and on output via diode to the second and third voltage transducers, base amplifier, alarm interface scheme and executive relay control scheme.

And it is supplied with the controller has the functions extension module, connected to the microprocessor.

Besides the address micro-module has the card that contains microprocessor and flexible inputs, voltage transducer of direct current, which has at least four flexible inputs; card with microprocessor and voltage transducer is filled with compound and covered with insulating skim; there are at least two flexible inputs that can be connected to the sensor and to address connection line, and they are linked to the input-output channels of microprocessor; first flexible input can be connected to the common wire, common microprocessor input and to the power supply input of microprocessor; the second output can be connected to the power source of direct current.

Besides the address micro-module has five flexible inputs, the relay is installed between fifth flexible input and common wire, this relay can be connected to the executive and/or alarm devices.

DETAILED DESCRIPTION

In middle and large enterprises all available equipment as a rule cannot be physically connected to a single computer. Moreover, the maximum length of connection is usually limited by a few hundred meters. To overcome these problems and to provide a nearly unlimited scalability and flexibility the complex has the multi-section architecture.

Figure 1:
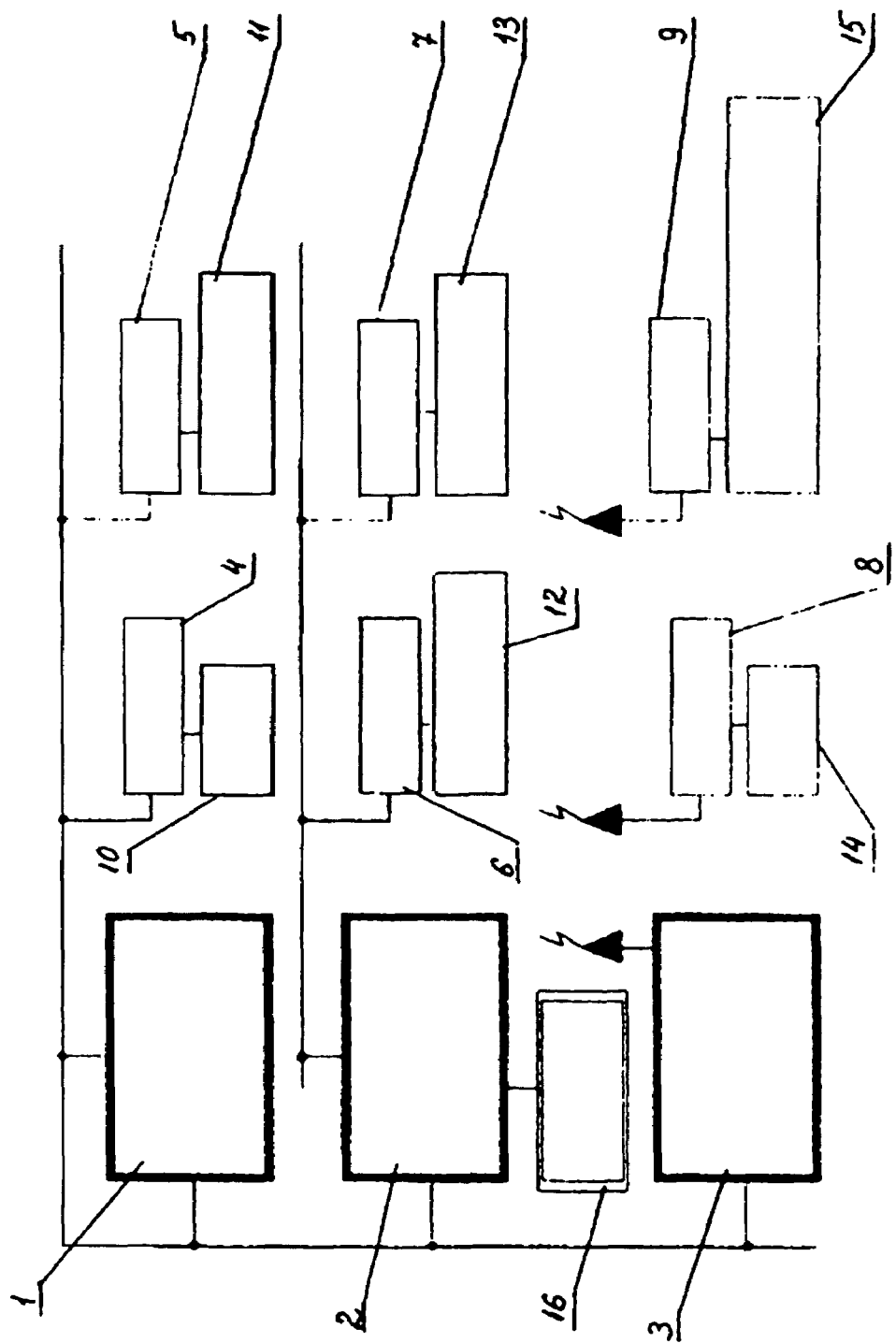
FIG. 1 is a schematic block diagram, depicting an example enterprise maintenance system.
Figure 2:
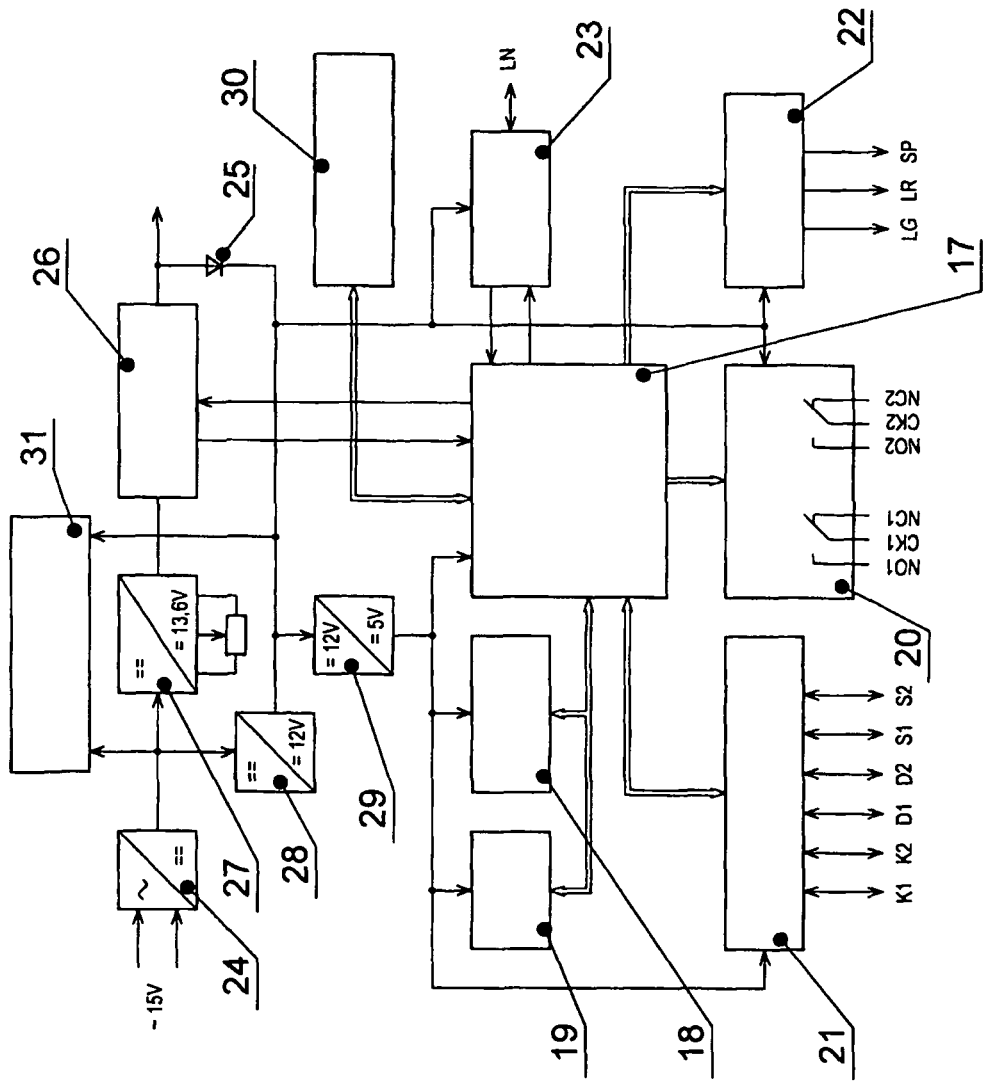
FIG. 2 is a schematic diagram, depicting a controller.
Figure 3:
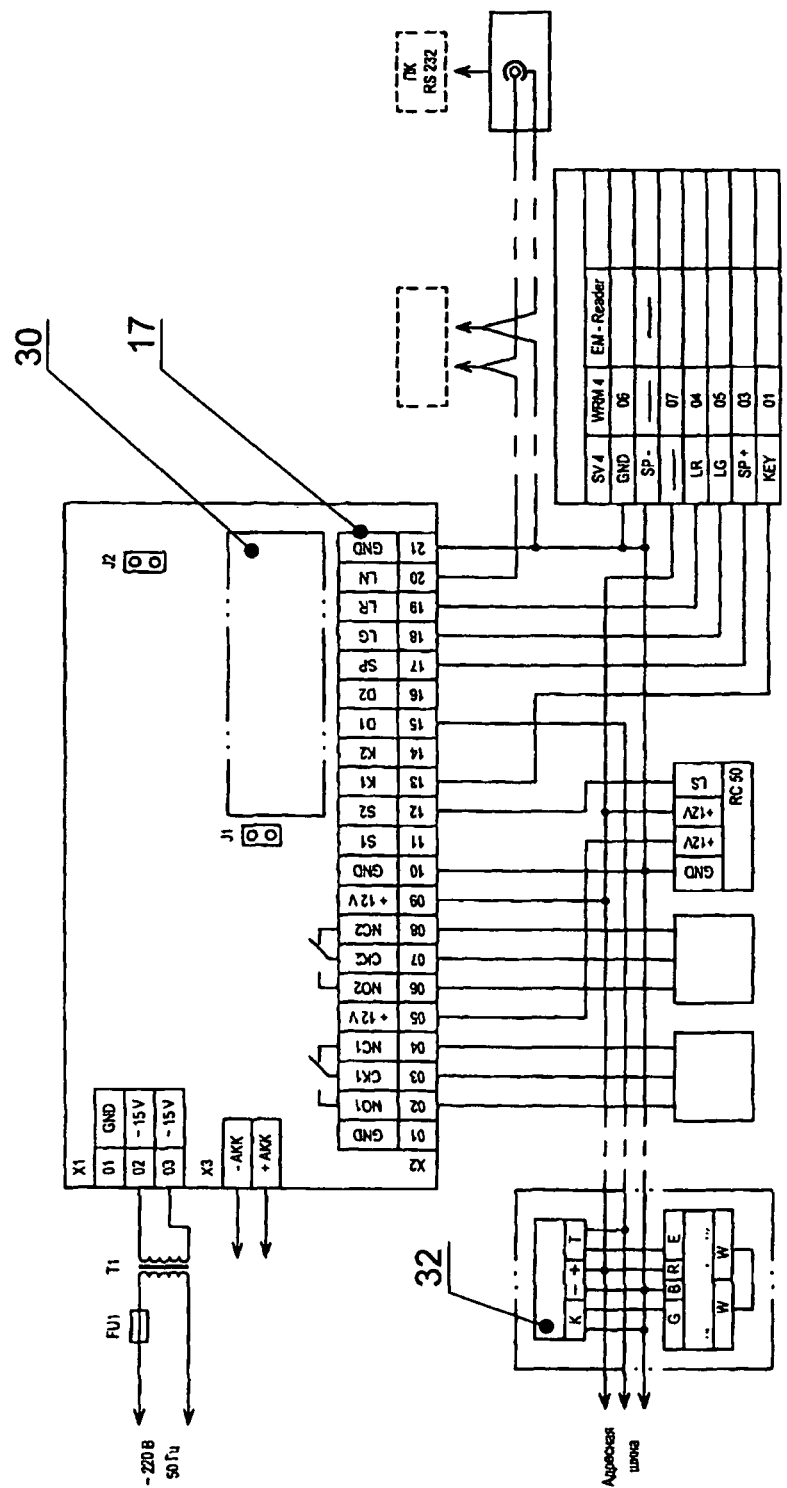
FIG. 3 is a schematic diagram, depicting an example of a connection of guard device to the controller.
Figure 4:
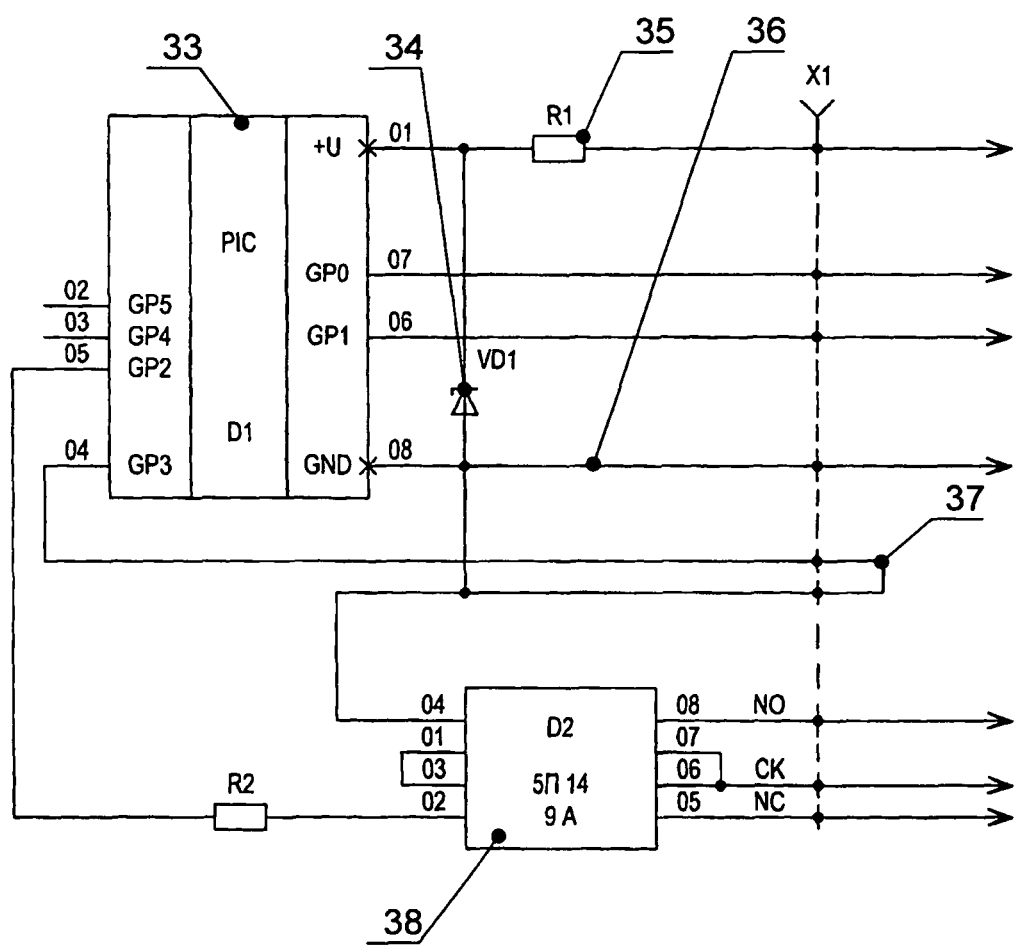
FIG. 4 is a schematic diagram, depicting an address micro module with a relay.

On the example illustrated on FIG. 1 the address space is divided for several zones: the firsts of them includes Water supply and Electrical appliances control, the second includes Heating systems and Air-conditioning systems, the third (or N) includes Intrusion protection and Access control system. The universal controllers 1, 2, 3 accordingly located in every zone recognize all occupied addresses and select one of the several standard algorithms, and use it for further work with address micro-modules. In every zone there are appropriate micro-modules (microchips) 4 and 5; 6 and 7; 8 and 9, accordingly, as well as executive devices: motor pumps 10, lightning, domestic electrical appliances 11 (including the blinds), heating equipment 12 (boilers, radiators, heat-insulated floors), air-conditioning systems 13, sensors of intrusion protection system 14, means of access control system 15. The central server PC, which can be the controller 2, for example, has the control panel 16, services the common database and centrally controls all equipment. Active and passive components (sensors, executive gears and controllers) are located in a single address space. Therefore the number of connections is minimal, and the system configuration can be changed after commissioning, even during the working process in the building.

Universal controller (PC) contains printed circuit card (not illustrated), which include microprocessor 17, permanent memory 18 of volatile memory microchip type, internal clock device 19 and executive relay control scheme 20, communication channel interface and protection scheme 21, alarm interface scheme 22, base amplifier 23 and unit of controller functions extension 30. Internal clock device 19 is a device of real time and date control (for example, clock microchip) together with permanent memory 18 is connected to microprocessor 17, the power supply is provided by ac-to-dc inverter 24, diode 25, external accumulator charging control scheme 26 (not a part of controller and not illustrated), and three voltage transducers 27, 28, 29. First and second transducers 27, 28 are linked to the output of ac-to-dc inverter 24, and the third transducer 29 is linked to the microprocessor 17, permanent memory 18, internal clock device 19 and communication channel interface and protection scheme 21. First, second and third voltage transducers 27, 28. 29 of direct current have outgoing voltage 13.6V, 12V and 5V accordingly.

Microprocessor 17 is connected to the control chain of scheme 26 of external accumulator charging control, which has a link on input to the first voltage transducer 27, and on output via diode 25 to the voltage transducers 28, 29, base amplifier 23, alarm interface scheme 22, executive relay control scheme 20 and unit of controller functions extension 30, which may be a part of controller. The controller has connection line linked to the input-output channels of microprocessor 17, control and alarm lines, common wire, and terminal screw (not illustrated) for wiring connections.

The controller also includes balance resistors and other standard elements (not illustrated), which are not included in necessary functional units.

The source of power is equipped with main/accumulator power supply indication scheme 31, linked on input to ac-to-dc inverter 24, and on output via diode 25 to output of external accumulator charging control scheme 26 and ac-to-dc inverter 24.

The controller can be equipped with ventilator (not illustrated). In case the ventilator is presented, the power source includes the card of ventilator control, connected to ac-to-dc inverter 24 and voltage transducers 28, 29; this card consists of serially linked thermal relay, comparator and transistor (not illustrated).

Component parts of the controller illustrated schematically on the block diagram (communication channel interface and protection scheme 21, executive relay control scheme 20, alarm interface scheme 22, external accumulator charging control scheme 26 and main/accumulator power supply indication scheme 31) is related to the digital combined automats, which familiar with structure synthesis methods on the base of conceptual function definition (information about functions, contained in definition), i.e. they can be generated using the known rules and methods, because of this automatic device can be obtained according to needed requirements. Mentioned in description electrical lines and common wire as well as standard elements have graphical and letter symbols on drawings in accordance with the State Standard Specification (GOST) 2.743-91 "Graphical Symbols on Diagrams. Digital Hardware Elements". Used elements and microchips (elemental base) illustrated on drawings according to the standardized symbol system, are standard items and are used in accordance with published catalogs. In particular the series-produced chips are used as a microprocessor, for example microcontrollers PIC16F, PIC18F according to "Information catalog" published by Gamma, St. Petersburg, 2002. The chips of Atmel type and others can be used as well.

On FIG. 1-4 the preferable diagrams are illustrated, but they do not eliminate other examples of synthesis.

THE BEST EMBODIMENT OF THE OF THE INVENTION

As the enunciators (not illustrated), which connected to the controllers 1, 2, 3 . . . N via address micro module 4-9 . . . n, the following devices as an example can be used: reader (card reader, key reader and so on), intrusion protection enunciator (window), solenoid contact protection enunciators, movement sensors, level sensors, pressure transducers, liquid consumption transducers, current transducer, transducers of other parameters, magnetically operated sealed switches, thermal (fire) enunciators, smoke (fire) enunciators, combined fire protection and other enunciators.

Address micro-module or universal microchip, which are the same (FIG. 4), has the card (not illustrated) that contains microprocessor 33 and flexible inputs, voltage transducer of direct current, which consists of voltage-reference diode 34 and resistor 35 and has five flexible inputs in present version (not illustrated). Card with installed on it microprocessor 33, voltage-reference diode 34 and resistor 35 is filled with compound and covered with insulating skim, that are transparent, so the card with microprocessor 33 can be seen. There are at least two flexible inputs that can be connected to the sensor 32 (FIG. 3) and to address connection line, and they are linked to the appropriate input-output channels of microprocessor 33; first flexible input can be connected to the common wire 36, common input of microprocessor 33 and to the first output of voltage-reference diode 34, which linked via second output to resistor 35 and to power supply input of microprocessor 33; the second output of resistor 35 is another flexible input of address micro-module and can be connected to the power source of direct current not illustrated). Preferably the address micro-module has jumper 37 between fifth input and common wire 36. Resistor 35 has for example resistance of 5.1±0.5 kilo ohm. Microprocessor 33 has firmware and identification number, labeled by manufacturer. Microprocessor 33 setting is carried out in plug-and-play configuration for processing and converting of individual signals generated by sensors to single program type for transmission to the controller, and for converting of signals generated by controller from single program type to the individual commands to peripheral equipment. The relay 38 is installed between one flexible input and common wire 36, and can be connected to the executive and/or alarm devices (not illustrated).

The series-produced chips are preferably used as the microprocessor 33, for example single-chip microcontrollers PIC12C5, PIC12C6 according to catalog "Microcontrollers. Version 2. Single-chip microcontrollers", published by DODEKA, Moscow, 2000.

The solid-state optical-electronic relay 5П 14.9A can be used as the relay 38 according to "Electrical Components and Appliances Catalog", 2002.

The composition of compatible hardware of the system is defined on the basis of devices specified in the table below.

TABLE

| Items indication on the drawings | Description |
| --- | --- |
| Items indication on the drawings | Description |
| PB | Power unit |
| L**** | Controller |
| DGR | Address microchip (electronic relay with galvanic isolation, "dry contact" control) |
| DGT | Address microchip (specialized transistor, "dry contact" control) |
| DGV | Address microchip (electronic key, "dry contact" control) |
| DLR | Address microchip (solid-state relay, power circuit integrity control) |

TABLE-continued

| Items indication on the drawings | Description |
| --- | --- |
| Items indication on the drawings | Description |
| DLT | Address microchip (specialized transistor, power circuit integrity control) |
| DLV | Address microchip (electronic key, power circuit integrity control) |
| TMP | Temperature transducer |
| HMD | Humidity transducer |
| AD5 | Analog-to-digital converter (range of measured signal 0-5 V) |
| AD10 | Analog-to-digital converter (range of measured signal 0-10 V) |
| DTR | Digital transmitter/transducer |
| 4372-001-41113704-98 РЭ | Operating Manual |

L 3D—controller for access control system; the entrance point is a door.

L 3T—controller for access control system; the entrance point is a turnstile.

L 3TK—controller for access control system; the entrance point is turnstile+card reader.

L 3SV—controller for access control system; the entrance point is gate or lifting barrier.

Power—power supply indicator.

LN—address bus of data exchange between computers via converter and controllers (L-BUS)

IN—indicator of command receiving via LN.

OUT—indicator of command and date transmission via LN.

LN—address bus of data exchange between controller and address microchips.

ON—switch on of additional supply of bus LN.

OFF—switch off of additional supply of bus LN.

The devices included in of compatible hardware list above, are individually characterized by the following (address micro-modules in technical specifications are usually indicated as the address microchips):

Analog converters AD5, AD10 measure incoming analog signals, convert them in corresponded digital signals and transmit to the controller for further processing.

Address microchips are the cards covered with insulating skim, which have flexible outputs for connection to the address bus and to controlled or executive device.

Analog converter DAC receives from controller via address bus the digital codes, converts their values to appropriate analog signal and sends it to executive device.

Address microchips DGR (the executive element of microchip is solid-state relay), DGT (the executive element of microchip is specialized transistor), DGV (the executive element of microchip is electronic key) are used for load control and for transmission of microchip control output state to the controller (closing to common output or break). The light displays, alarms, optical-electronic relays and so on can be used as the load. Any devices can be used as the controlled devices, both with normal closed (NC) and normal opened (NO) contacts such as bottoms, magnetically operated sealed switches etc. The jumper defines the operating state of the contacts:

If jumper is closed, the contact of connected device is normally closed to the earth;

If jumper is opened, the contact of connected device is not normally linked to the earth.

Address microchip DGR (the executive element of microchip is electronic relay with galvanic isolation) is used for transmission of microchip control output state to the controller (closing to common output or break) and for load control. The light displays, alarms and other devices, which require galvanic isolation, can be used as the load. The type of load is active, inductive.

Any devices can be used as the controlled devices, both with normal closed (NC) and normal opened (NO) contacts such as bottoms, magnetically operated sealed switches etc.

The jumper defines the state of the contacts:
If jumper is closed, the contact of connected device is normally closed to the earth;
If jumper is opened, the contact of connected device is not normally linked to the earth.

Address microchip DGT (the executive element of microchip is specialized transistor, protection from short-circuit, current overload, high voltage) is used for transmission of microchip control output state to the controller (closing to common output or break) and for load control. The light displays, alarms and other devices, which not require galvanic isolation, can be used as the load. The type of load is active, inductive.

Any devices can be used as the controlled devices, both with normal closed (NC) and normal opened (NO) contacts such as bottoms, magnetically operated sealed switches, contacts of relays etc.

Address microchip DGV (the executive element of microchip is electronic key) is used for transmission of microchip control output state to the controller (closing to common output or break) and for load control. The optical-electronic relays can be used as the load. The type of load is active.

Any devices can be used as the controlled devices, both with normal closed (NC) and normal opened (NO) contacts such as bottoms, magnetically operated sealed switches, contacts of relays etc.

Address microchip DLR (the executive element of microchip is electronic relay with galvanic isolation) is used for transmission of microchip control output state to the controller (closed power circuit corresponds to logical "1", short-circuit failure or break correspond to logical "0") and for load control. The optical-electronic relays, alarms and other devices, which require galvanic isolation, can be used as the load. The type of load is active, inductive.

Any devices, where the power circuit integrity shall be controlled, can be used as the controlled devices, for example devices with relay winding, resistor winding an so on, as well as devices both with normal closed (NC) and normal opened (NO) contacts such as bottoms, magnetically operated sealed switches etc.

Address microchip DLT (the executive element of microchip is specialized transistor for protection from short-circuit, current overload, high voltage) is used for transmission of microchip control output state to the controller (closed power circuit corresponds to logical "1", short-circuit failure or break correspond to logical "0") and for load control. The optical-electronic relays, alarms and other devices, which not require galvanic isolation, can be used as the load. The type of load is active, inductive.

Any devices, where the power circuit integrity shall be controlled, can be used as the controlled devices, for example devices with relay winding, resistor winding an so on, as well as devices both with normal closed (NC) and normal opened (NO) contacts such as bottoms, magnetically operated sealed switches etc.

Address microchip DLV (the executive element of microchip is electronic key) is used for transmission of microchip control output state to the controller (closed power circuit corresponds to logical "1", short-circuit failure or break correspond to logical "0") and for load control. The optical-electronic relays may be used as the load. The type of load is active.

Any devices, where the power circuit integrity shall be controlled, can be used as the controlled devices, for example devices with relay winding, resistor winding an so on, as well as devices both with normal closed (NC) and normal opened (NO) contacts such as bottoms, magnetically operated sealed switches etc.

Temperature transducer TMP is used for measuring, converting and transmission of data about ambient air temperature to the controller. Data are transmitted to the controller as the digital signals and display the actual temperature.

Address chip is an open-frame card covered with insulating skim. It has flexible outputs for connection to the address bus.

Humidity transducer HMD is used for measuring, converting and transmission of data about ambient air humidity to the controller (moisture is not condensing on the probe). Data are transmitted to the controller as the digital signals and display the actual humidity in units.

Touch Memory readers, for example SV4, SV6 and so on, as well as Proxy card readers, for example PLR2, WRM4 and so on, can de used as the readers. Reader is used for connection of controller to the address bus, to assign the certain address to the reader, as well as for key codes transmission to the controller. Address microchip DTR accepts commands from controller and responses accordingly.

Converter is used for interfacing of computer COM-port and two-wire special interface of controller connection line to provide the data exchange between computer and controllers. On the front panel of converter there are power indicator (red LED) and indicators of data exchange control, one for each line (green LED). On the backside of converter there are socket for the network adaptor connection and wire for connection to COM-port of computer.

Contact surface for reading of Touch Memory keys is located on the front panel of converter. Proximity card reader is located inside of the case, under the top cover of converter.

Address microchip DTR is used for connection of reader to the address bus, to assign the certain address to the reader. DTR transmits key codes to the controller and control the LEDs and sounder of readers, depending from the controller operating mood. Proximity card readers, for example PLR2, WRM4 etc., may be used as the readers.

Address microchip FIRE is used for state control of two-wire ribbon cable of automatic fire enunciators (FE) and provide the transmission of the following events to the controller:
Normal—'on duty' mood,
Fire—in case of triggering of one or more FE in alarm cable,
Short-circuit failure of alarm cable,
Break of alarm cable.

Address microchip provides the protection from FE false triggering using the following algorithm: if one or more FE is triggered, the microchip removes voltage from alarm cable for a short time, then checks the voltage in alarm cable once again and, subject to the second check, either microchip operates in 'on duty' mood, or reports the alarm 'Fire'.

Break of alarm cable control is provided by voltage-reference diode.

The jumper defines the state of the enunciators' contacts:
Jumper is closed for thermal fire enunciators with normally closed contacts;
Jumper is opened for smoke fire enunciators or for thermal fire enunciators with normally opened contacts.

Address microchip is the card, filled with compound and covered with insulating skim, with flexible outputs for connection to the address bus and controlled devices. Address microchip shall be connected to the first in chain FE (if more than one is used), and the voltage-reference diode shall be connected to the last one. Small sizes of microchip and voltage-reference diode allow installing them inside of the FE.

Temperature transducer TMP is used for measuring, converting and transmission of data about ambient air temperature to the controller.

Humidity transducer HMD is used for measuring, converting and transmission of data about ambient air humidity to the controller (moisture is not condensing on the probe).

Automatics controller is used for autonomous operation according to the preset program, collecting, processing and registration of transducers' and executive devices signals. The device control different executive devices (using address micro-modules) and allow displaying the actual and reference data about unit state on the personal computer of operator.

Modular engineering system operates in the following way.

The data about movements (of employees, visitors etc.) and other events (fire, flood, invasion etc.) are collected from different hardware devices (controllers, readers, transducers, camcorders etc.), mounted on security zone. The composition and number of devices are not limited and depend from territory size, required security level, customer's needs. Every event either shall uniquely correspond to the body under observation (employee), or shall be associated with it to a certain probability (either Ivanov (probability is 30%), or Petrov (probability is 20%), or somebody else (probability is 50%) had come trough the door), or may not be associated to anybody (fire in certain room).

Incoming data is systematically processed continuously using the different and unknown yet mathematical and heuristic methods and algorithms (neural network, data mining methods, something else . . . ). The result of this processing shall be the dynamic computer model of protected territory, which provides details about:
 a) Actual location of everybody under observation;
 b) Movement direction of bodies under observation;
 c) State of all intrusion, fire and other transducers, as well as of all guard devices;
 d) etc.

Every address micro-module transmits to the corresponded universal controller the data about state of announcers' (transducers') "dry contacts", which they are connected to. Address micro-modules at the same time provide the interaction between universal controllers and peripheral devices of different security systems and automation systems. Due to small size micro-module can be mounted inside of any device, for example inside of transducer, compressor, reader, etc. address micro-module is universal because it is possible to program microprocessor during its manufacturing.

Microprocessor 33 of address micro-module is interrogated by controller after preset time intervals, and transmits its number and data about state of transducer 32 to the controller 1 . . . N. Transducer 32 may be in normal/not normal state, and the controller using the address micro-module may accept via input-output channels and connection line with the controller, for example, the following information about state of transducer, converted in unified program code:

1. Transducer is ready to operate—normal state, live contacts of transducer 4 are closed (if transducer 32 with normally closed contacts is used).
2. Transducer 32 is triggered—not normal state (alarm), live contacts of transducer 4 are opened.
3. No response signal from micro-module after interrogating—fault, intentional or accidental break in line (transducer power supply chain is opened) or short-circuit failure.

If required the transducer 32 may generate analog signal (temperature, voltage, humidity, angular deflection etc.) In this case the microprocessor 1 of address micro-module converts incoming signal to digital signal of voltage-normalized unified program code for the controller.

The controller executes the final processing of signals from address micro-module 4-9. Besides information about transducer 32 state, micro-module transmits its number to the controller; this allows determining the event location uniquely, where the response actions shall be applied.

Acoustic, optical and other enunciators and power executive devices operate in single address virtual space that provides measuring network configuration, as well as the interfacing of software of all equipment and interaction between controllers 1 . . . N and peripheral devices 10-15.

Due to plug-and-play configuration of microprocessors 33 of address micro-modules, the individual data processing is provided, so the data from transducers are converted to unified program code and transmitted to the controller, and the signals from controller are converted to individual commands to peripheral equipment; in this way the single address virtual space is formed, that provides equipment software interfacing and data exchange between peripheral devices and controllers that interact with PC for setting and monitoring of the complex only.

Optical-electronic relay 38 process the commands of microprocessor 33, received from PC via controller, and switch on the executive devices, for example, open the door or/and passage through the turnstile, open the gate, trigger the fire extinguishing devices, open/close damper, switch on/off ventilator or air-conditioner, or switch on the restrictive or enabling signaling devices such as alarm, indicator on the control panel in security room, banner or LED.

Voltage-reference diode 34 limits static voltage deviations more than 5V, transmitting excessive power to the power circuit. In result address micro-module transmit to the controller via connection line up to 1 km the voltage-normalized signals, regardless of interferences, without overload and deformation. Microprocessor 33 in accordance with the program forms the signal, which interfaces with the controller, and is not depended from physical sensing parameter of transducer 32 and from its constructional appearance.

In this way the operating controller and operator of PC, besides the data of system operation and connection line state, receive the information about location of controlling transducer 32 that transmits the signal.

Technical specification of address micro-module:
Voltage 10-14V, current 2 mA;
Address micro-module due to its efficient dimensions can be mounted in standard devices, for example, fire and intrusion sensors, transducers of pressure, position, level, etc.

When the complex is operating the controller is acting in following way:

After the power supply is applied, the first converter 27 generates 13.6V dc, via diode charges external back-up accumulator (with capacity up to 7 A/hour), and via another diode provides the power supply of the controller and microprocessor 17. In case of abrupt increase of power consumption by accumulator, the polyswitch and relay are triggered, so their contacts open and charging stops. After 30 sec. microprocessor 17 generates the command to close the contacts. In this way the accumulator charging control scheme 26 provides the operability of device and eliminates the failures. If the main circuit power supply is removed, accumulator provides the back-up supply of device. Main/accumulator power supply indication scheme 31 indicates the source of controller's powering, if the main circuit power supply is applied the green LED is lighting, if the power supply from accumulator is applied the red LED is lighting.

The first, second and third voltage transducers 27-29 generate the output current according to their voltage stabilizers settings, of 13.6V, 12V, 5V accordingly. Stabilizer of the first voltage transducer 27 is adjustable. Ventilator switch on/off if thermal relay is triggered; this relay is located on radiator, which collect the warm from voltage transducers 27-29, so the long faultless operation is provided.

If controller is on duty mood and the system is energized, the microprocessor 17 interrogates periodically all transducers 32 (announcers) via address micro-modules 4-9, mounted inside of the engineering equipment of transducers. Transducers 32 report the state of the object. Address micro-modules 4-9 control the state of transducers 32 and via communication channel interface scheme 21 transmit this data to the controller as the notices. As a rule, notices transmission is carried out by all address micro-modules as the digital code in the single address virtual space that provides measuring network configuration for interfacing of equipment software and interaction between controllers and peripheral devices.

If one of possible actions is occurred in any zone, for example key is touched to the certain reader (announcer) of the group, the appropriate address micro-module 8 generates the signal on output of the communication channel interface scheme 21. Communication channel interface and protection scheme 21 provides the data exchange with microprocessor 17 via input-output channels (logical inputs). Microprocessor 17 receives via connection line the voltage-normalized signals (5V), regardless of interferences, and the controller 1-3 in whole may receive both the weakest useful signals affected by simultaneous intensive interferences, and very strong signals without overload and deformation. At the same time the controller transmits via connection line the voltage-normalized signals (5V).

This eliminates the transmission of fault signals to the logical inputs of microprocessor 17, so the normalized actual signals transmission is provided. This also provides the possibility of interaction with different transducers, mounted in different points of the connection line.

Microprocessor 17 finds in permanent memory (ROM) 18 the key number and controlling zone number, where the access is allowed using this key. In accordance with the program and information of permanent memory 18 and internal clock device 19 the microprocessor defines whether the person with this key has the right of access to this zone at the present time and date. Time control device 3 allows for microprocessor 17 to define acceptability of different signals in time—it compares received data with the data about working hours, days off, holydays etc., stored in permanent memory 18.

If the data of permanent memory 18 and program of microprocessor 17 allow the access, the microprocessor 17 via alarm interface scheme 22 sends the triggering signal to the signaling devices. Scheme 22 enables the elements of signaling (announcing) system, i.e. appropriate signal sounds and enabling banner lights or green LED flashes. At the same time scheme 22 provides the voltage interfacing, so the signals (5V) of microprocessor 17 is transformed in input signals of transistors (12V), and interference rejection using the suppressors, which limit static positive and negative deviations of the current 12V.

Moreover in single address virtual space the microprocessor 17 via executive relay control scheme 20 transmits signals to the appropriate address micro-modules, which using the special software and executive gears open the door or/and passage through the turnstile, open the gate, trigger the fire extinguishing devices, open/close damper, switch on/off ventilator or air-conditioner etc. Executive relay control scheme 20 provides the relay triggering and closing of executive devices circuits. For this reason the signals (5V) of microprocessor 17 in control channels are transformed in signals (12V) on inputs of executive relay, which in turn may close power circuits of executive gears with higher voltage, for example 220V, 380V etc.

If the data stored in permanent memory 18 and program of microprocessor 17 do not allow the access, the microprocessor 17 via alarm interface scheme 22 switch on alarm—sharp siren sounds, alarm indicates on security panel, prohibitive banner lights or red LED flashes.

Moreover microprocessor 17 via alarm interface scheme 22, using address micro-modules 4-9 and executive gears, can block the door or/and passage through the turnstile, close the gate, switch off fire extinguishing devices, open/close damper, switch on/off ventilator or air-conditioner.

At the same time it is possible to control the employees' presence/absence in certain zone during the working hours and to control the actual hours worked. Additionally if employee is in the certain room it is possible to block/unblocked supply of water, power (for example lightning), spare parts and other materials. In some cases the more complicated access codes data exchange can be used, for example, touching the key for one more time, or using the combination of keys, or keying in the digital code (password) on the keyboard, etc.

In case of smoke or increase of temperature, the announcers generate and send appropriate signals via address micro-modules, where they are transformed to the unified program code, to the communication channel interface and protection scheme 21 and then to the microprocessor 17. According to the program the microprocessor 17 via alarm interface scheme 22 sends the signal of fire alarm to all premises, where the evacuation shall be done, to the security room and the enterprise's management. At the same time microprocessor 17 via executive relay control scheme 20 enables the fire extinguish devices—supply with water, foam, fire extinguishing powder etc., and also isolate the premise in the fire from other premises, block or close the doors and windows, turn off the elevator and other devices. Similarly, the pressure transducer's signal can be processed in case of pressure reduction below preset level because of break in pipeline or reservoir.

In case of breaking of doors, door locks, windows, etc., the announcers generate appropriate signals as well and send them via communication channel interface and protection scheme 22 to the microprocessor 17. According to the program the microprocessor 17 via alarm interface scheme 22 sends the signal of burglary alarm to the security room, and to the enterprise's management. At the same time microprocessor 17 via executive relay control scheme 22 enables the protection devices—close the grating, gates, switch on the power supply of the defense wire barriers, switch off the lightning and water supply, close the safes etc., and also isolate the premise, where the alarm is triggered, from other premises, block or close the doors and windows, turn off the elevator and other devices.

Base amplifier 23 in multibranch system provides the connection with the operator's PC, as well as with other controllers that service the separate groups of announcers and executive devices. Linked to the negative comparators' inputs resistors are used for voltage reduction and provide the forming of voltage-normalized signals on comparators' outputs, regardless of incoming signal type on the positive inputs. Thus under the appropriate programming of microprocessor 17, it is possible to enable the executive and signaling devices, controlled by one controller, in case of triggering of announcer (transducer), controlled by another controller.

Unit of controller functions extension 30, if used, receives signals via additional connection lines, generates (amplify, normalize) run enabling signals to additional signaling devices and/or receives (generate, amplify, normalize) relay-triggering signals in additional executive gears circuits. For this reason extension unit may combine functions of one or more schemes: communication channel interface and protection scheme, relay control scheme, alarm interface scheme. If the unit of functions extension 30 is used, the signals received via additional connection lines are processed similarly to the method described above.

The panel 16 displays not only the floor/room number, but also the certain place on the building plan, state of transducer 32, fire zone or security zone.

In result the effective modular engineering system is created, and also the set of engineering systems is extended.

INDUSTRIAL APPLICATIONS

At the same time the adjustment is simplified, the functional capabilities are extended for optimal system assembling and interaction with transducers of different construction, software and measured points, installed on long-distance communication lines, and for control of executive gears of different types, warning elements due to possibility of hardware configuration adjustment without operator's interference and without need to reboot; the power supply reliability is improved due to possibility of dynamic switch of system devices to the power-saving mode that allows for devices to use the energy for useful work only, and the devises which is not used during the preset time interval are switched off and switched on later by request; the reliability and accuracy of executive devices control are improved as well, as the risk of compatibility failure in case of static and impulsive interferences is eliminated.

The invention claimed is:

1. A modular engineering system for a complex having at least one zone, the modular engineering comprising:
a plurality of interacting controllers, each controller having an internal clock device providing real time and date control, each controller connected with a group of peripheral equipment located in one of a zone of the complex, the interacting controllers each having at least one module selected from the group including transducers, executive devices and announcers;
at least a subset of the plurality of controllers having configurations which provide standardized wire configurations with respect to each other, providing universal connectivity and operating using a common software standard to provide a unified program code;
the subset of controllers having micro-modules, each comprising at least one microprocessor, the micro-modules providing address control and providing interfacing with peripheral equipment for each of the controllers, and having a plug-and-play configuration for dynamic individual event and data processing, the microprocessor configured to operate according to transformation to the unified program code and transmission to the controller and for transformation of the unified program code of controller to individual commands for peripheral equipment;
a single address space having an organization to provide interfacing of data exchange between peripheral equipment and controllers;
the controllers having a capability of registering and receiving information concerning predetermined events;
the peripheral equipment operable substantially simultaneously jointly within the groups, with each group connected with the controller using at least one interfacing address micro-module to provide interfacing of data exchange between peripheral equipment and controllers as a communication channel interface for providing control of the peripheral equipment.

2. The modular engineering system according to claim 1, wherein:
the controllers comprise personal computers; and
a central personal computer connected to the controllers provides data registration and notices of events transmission.

3. The modular engineering system according to claim 2, further comprising:
the controller having a printed circuit card, which contains the microprocessor, the microprocessor connected to a power supply source, a non-transient memory device, the internal clock device and executive relay control circuit, the connection lines with communication channel interface and protection circuit, an alarm interface circuit and a base amplifier;
the internal clock device and the non-transient memory device having a connection to the microprocessor;
the power supply comprising an AC-to-DC inverter, a diode, an external accumulator charging control circuit, and three voltage transducers;
the first and second transducers linked to an output of the AC-to-DC inverter, and the third transducer linked to the microprocessor, the non-transient memory device, an internal clock device and a communication channel interface and protection circuit; and
the microprocessor connected to a control chain of external accumulator charging control circuit, the external accumulator charging circuit having a link on input to the first voltage transducer, and on output via diode to the second and third voltage transducers, base amplifier, alarm interface circuit and executive relay control circuit.

4. The modular engineering system according to claim 2, further comprising:
an address micro-module comprising at least one microprocessor, flexible inputs, a voltage transducer for direct current, and having at least four flexible inputs;
a card containing one of the microprocessors and voltage transducer filled with compound and covered with insulating skin; and
at least two flexible inputs capable of connection to a sensor and to one of the interfacing address micro-modules, and linked to input-output channels of the microprocessor, and an output of the voltage transducer for direct current connected to a power supply input of the microprocessor.

5. The modular engineering system according to claim 4, wherein the address micro-module has five flexible inputs, with the relay installed between a fifth flexible input and a common wire and to at least one of the executive device or an alarm interface.

6. The modular engineering system according to claim 1, further comprising:
   each controller having printed circuit card comprising the microprocessor, and power supply source, a non-transient memory device, a communication channel interface and protection circuit, base amplifier and the internal clock device connected to the microprocessor.

7. The modular engineering system according to claim 6, further comprising:
   at least one of the printed circuit cards further comprising connection lines with communication channel interface and protection circuit, an alarm interface circuit, a base amplifier connected to the microprocessor:
   the power supply comprises an ac-to-dc inverter, diode, external accumulator charging control circuit, and three voltage transducers; first and second transducers linked to an output of ac-to-dc inverter, and the third transducer linked to the microprocessor, internal clock device and communication channel interface and protection circuit; and
   the microprocessor connected to a control chain of the external accumulator charging circuit, having a link on input to the first voltage transducer, and on output via a diode circuit to the second and third voltage transducers, base amplifier, alarm interface circuit and an executive relay control circuit.

8. The modular engineering system according to claim 1, further comprising:
   an address micro-module comprising at least one microprocessor, flexible inputs, a voltage transducer for direct current, and having at least four flexible inputs;
   a card containing one of the microprocessors and voltage transducer is filled with compound and covered with insulating skin; and
   at least two flexible inputs capable of connection to a sensor and to one of the interfacing address micro-modules, and linked to input-output channels of the microprocessor, and an output of the voltage transducer for direct current connected to a power supply input of the microprocessor.

9. The modular engineering system according to claim 8, wherein the address micro-module has five flexible inputs, with the relay installed between a fifth flexible input and a common wire and to at least one of the executive device or an alarm interface.

\* \* \* \* \*